United States Patent [19]
Bartlett et al.

[11] 3,832,550
[45] Aug. 27, 1974

[54] WIDE-RANGE RADIATION GAGE FOR DETERMINING DEVIATION OF A MATERIAL PROPERTY WITH A CONTROLLED-GAIN DETECTOR IN AN INTERRUPTABLE SELF-BALANCING MEASURING LOOP

[75] Inventors: William G. Bartlett, Stockertown; Carvel D. Hoffman, Allentown; Duane T. Jones, Coopersburg; Edmund L. Mangan, Bethlehem, all of Pa.

[73] Assignee: Bethlehem Steel Corporation, Bethlehem, Pa. ; by said Jones

[22] Filed: June 22, 1972

[21] Appl. No.: 265,112

[52] U.S. Cl.................. 250/358, 250/361, 250/492
[51] Int. Cl............................................ G01j 39/18
[58] Field of Search ....... 250/83.3 D, 358, 361, 492

[56] References Cited
UNITED STATES PATENTS
2,467,812    4/1949    Clapp............................ 250/83.3 D Primary Examiner—Harold A. Dixon

[57] ABSTRACT

Deviation of a gaged material property, such as material thickness, density, or weight-per-unit area, from a nominal value in a wide range of values is determined by a single-range, penetrative-beam type of radiation gage having an interruptable self-balancing measuring loop that includes a controlled-gain detector, thereby providing the radiation gage with a continuously variable gain characteristic. Any nominal value of material gaging property may be pre-established in a wide range of values by inserting digital material standards from a built-in magazine into the radiation beam, thereby causing the self-balancing loop to balance at a corresponding point in the variable sensitivity range. The presence of material to be gaged is detected before entering the radiation beam and interrupts and holds the self-balancing loop at the preset nominal value, while also removing the standards from the radiation beam. Subsequent measuring signals, together with a nominal value signal, are processed in a deviation gain adjusting circuit, whereby a linear deviation signal throughout the entire variable gain range is produced and fed to a deviation indicator.

9 Claims, 4 Drawing Figures

PATENTED AUG 27 1974 3,832,550

WIDE-RANGE RADIATION GAGE FOR DETERMINING DEVIATION OF A MATERIAL PROPERTY WITH A CONTROLLED-GAIN DETECTOR IN AN INTERRUPTABLE SELF-BALANCING MEASURING LOOP

BACKGROUND OF THE INVENTION

1. Field of the Invention

This invention relates broadly to improved gaging apparatus for determining deviation of a material property, such as thickness, density, or weight-per-unit area, from a nominal value in a wide range of values. More particularly, this invention relates to a single-wide-range radiation gage for determining deviation of a material property from a nominal value with a controlled-gain detector in an interruptable self-balancing measuring loop. Hereinafter, the invention will be described with reference to a cold steel strip rolling mill where the radiation gages provide a thickness deviation signal of a moving steel strip. These signals are fed to a deviation indicator, or to profile analysis equipment, or fed as control signals to an automatic gage control system. However, the invention is equally applicable in a variety of other industrial and laboratory installations, as well as to gaging properties of other materials.

2. Description of the Prior Art

Thickness measuring gages are incorporated into contemporary steel rolling mills which produce both cold and hot rolled strips or plates. In a cold steel strip rolling mill, for example, a radiation gage is used which includes a source of penetrative radiation, such as X-rays, beamed at one side of a moving steel strip and opposite thereto is an electronic detector which produces an output signal which is representative of deviation in thickness along the moving strip relative to a preselected nominal or desired thickness value. Such gages operate in response to the mass absorption phenomenon. That is, when test material such as steel strip is caused to enter a beam of penetrative radiation and its thickness varies linearly, the amount of radiation absorbed by the steel strip per unit area thereof is registered exponentially or nonlinearly by a radiation-sensitive detector calibrated in terms of material thickness deviation. Radiation absorption, and therefore apparent material (steel) thickness, also varies (1) as a complex function of radiation wavelength and intensity, and (2) randomly because of the statistical manner in which X-radiation, for example, emanates from its source, hence requiring a sampling time to average such variations.

Commercially available radiation gages cover an overall range of measurement in multiple ranges, each of a discrete interval, and each interval being determined by presetting the level of either a variable potential X-ray source, or a voltage sensitive detector, or both. Nominal thicknesses are determined by various methods, depending upon the gaging technique used. There are two techniques most commonly used. One technique is the dual beam-dual detector technique in which an accurately positioned thickness standard wedge is placed in the reference beam, this being exemplified by General Electric Company's "Ray Mike" series of X-ray gages. The other technique is the complementary method in which thickness standards are inserted into the measuring beam such that the total thickness of the standards plus the material (steel) being measured equals one of a number of precalibrated points within the total range of the gage, this being exemplified in U. S. Pat. No. 3,524,063 to E. L. Mangan.

While both types of commercially available gages have proved successful in some respects, each type of gage has some drawbacks. For example, both types of gages lack a single-range feature for covering a wide range of thickness measurements. Both types of gages are costly and have complex electronic and/or electromechanical measuring circuits and equipment requiring frequent calibration checks and/or maintenance down-time. More importantly, breaking the measuring range of these gages into discrete intervals requires accurate and drift-free electronic circuitry to hold the radiation source and detector at the desired reference points, particularly if gage calibration is to be maintained for a reasonable duration. Moreover, use of thickness standards in the measuring beam of radiation during gaging requires the gage to measure more thickness of material (steel) than necessary, thereby resulting in a corresponding loss of detector signal while increasing the uncertainty of the measurement. Furthermore, prior art gages require complicated gain-changing circuitry to compensate the thickness deviation output readings for changes in nominal thickness and/or range.

SUMMARY OF THE INVENTION

One of the objects of this invention is to provide improved gaging apparatus which overcomes the foregoing difficulties in determining a material property.

Another of the objects of this invention is to provide single-range gaging apparatus for accurately determining a material property deviation from a nominal value over a wider range of measurements than heretofore available.

Another object of this invention is to provide radiation gaging apparatus adapted to use either an X-radiation or a nuclear source of radiation for determining deviation of a material property, such as steel strip thickness, from a nominal value thereof.

Still another object of this invention is to provide the aforesaid gaging apparatus which is simpler in design and less costly to construct, operate and maintain than heretofore available.

The foregoing objects can be obtained by a single-range radiation gage which includes either a constant average potential, or a monoenergetic, source of radiation and a scintillation type of radiation detector operating in an interruptable, self-balancing measuring loop which includes a controlled-gain photomultiplier tube to provide a continuously variable gain characteristic over a single, wide, range of measurements. The gage includes circuit means for automatically adjusting photodetector gain, a switched integrator for interrupting and holding detector gain at any point in the gain range so as to store a nominal property signal, a built-in digital standards magazine for selectively inserting and removing standards into and out of the radiation beam, a gaging material presence detector, deviation gain adjusting circuitry for processing the nominal property signal and the deviation measuring loop signal to produce a linear deviation signal. Utilization means includes an indicator or strip profile recording or analyzing equipment, or an automatic control system. Radiation detector operation is based on the phenomena of the nonlinear absorption of radiation by the material to be gaged, an inverse and nearly equal nonlinear gain characteristic of the photomultiplier tube, and the operation of the photomultiplier tube at a constant anode current. The deviation-measuring radiation gage is automatically standardized by inserting into the radiation beam the digital standards equal in value to the material to be gaged, and in response to the material presence detector, prohibiting change in the self-balancing loop by disabling the switched integrator and automatically removing the standards and allowing the material to be gaged to enter the radiation beam, whereby the deviation indicator displays the deviation of the material property from the nominal value established by the calibration standards.

DESCRIPTION OF THE PREFERRED EMBODIMENTS

Figure 1:
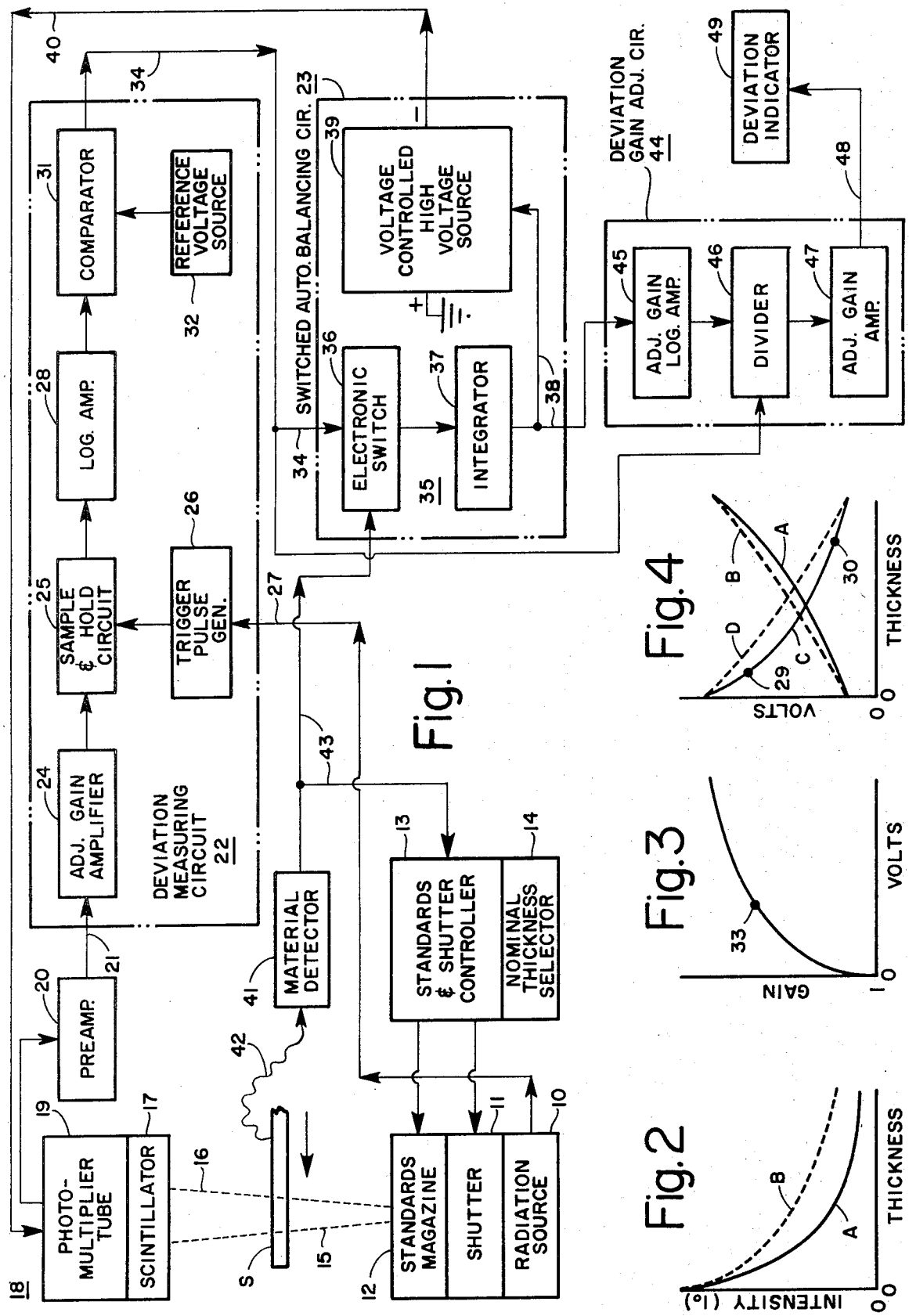
FIG. 1 is a block diagram of a wide-range, deviation-measuring, radiation gage embodiment of the present invention.

Referring to FIG. 1, a preferred embodiment of the invention will be described in relation to a wide-range radiation gage for accurately measuring the thickness deviation of a cold-rolled, low-carbon steel strip of known composition or grade, in 0.001 inch increments in a single range from 0.0 to 0.125 inch thickness. With the proper source of radiation, the invention may be applied to steel products of up to 3.000 inches thickness, and greater. Measurements are made in a cold steel strip rolling mill environment as noted above. The invention is not limited to this embodiment as other materials and material properties, such as density and weight-per-unit area, may be substituted for cold steel strip thickness.

In the preferred embodiment shown in FIG. 1, the thickness gage utilizes a source of radiation 10, such as the constant average potential generated by a stable X-ray generator, either pulsed or DC controlled, and operated in a controlled environment at a constant average level of 84 Kv. and a wavelength of about 0.195 Angstrom, as a source of penetrative radiation this will insure adequate photon penetration of steel having a thickness of at least 0.125 inch.

Coupled to radiation source 10 is a solenoid powered lead shutter 11 and digital calibration standards magazine 12 which are of the type disclosed in U. S. Pat. No. 3,524,063 to E. L. Mangan. The digital calibration standards consist of a binary-digit plurality of solenoid powered individual discs of known composition, each precisely ground to a predetermined thickness as required to cover the entire gage thickness range in 0.001 inch increments. Operation of the shutter 11 and calibration standards magazine 12 is under control of standards and shutter controller 13, the latter being responsive to nominal thickness selector 14 which includes thumb-wheel switch selectors, all as described in the Mangan patent, supra. Thus, the gage is calibrated and nominal thickness selections made at any 0.001 inch increment in the wide range of measurements.

When the shutter 11 is open, a beam of penetrative radiation 15 from constant source 10 is passed through steel strip S. In so doing, radiation beam 15 is subject to attenuation according to the nonlinear mass absorption phenomenon illustrated graphically in FIG. 2, curve A. Subsequently, this beam becomes known as a beam of emergent radiation 16. Radiation beam 15 will become attenuated as follows:

$$I = I_o e^{-(\mu/\rho) \rho t} \text{ where:} \tag{1}$$

$I$ = Intensity of emergent radiation 16
$I_o$ = Intensity of source radiation 15
$e$ = 2.71828
$(\mu/\rho)$ = Mass absorption coefficient of steel strip S
$\rho$ = Density of steel strip S
$t$ = Thickness of steel strip S A portion of emergent radiation 16 is absorbed by scintillator 17 which converts gamma photon energy into a light source that varies proportional to said radiation and therefore nonlinearly to the thickness of strip S. In practice, scintillator 17 is aligned so that the light source it produces is optically coupled to controlled-gain photodetector 18 which is positioned against scintillator 17 and is made lightproof.

Both scintillator 17 and photodetector 18 are located as an assembly above a window in an environmentally-controlled upper portion of a C-shape gage housing not shown. Radiation source 10, shutter 11 and calibration standards magazine 12 are located beneath a window in the lower portion of the gage housing and so positioned that radiation beam 15 is directed toward, and aligned with scintillator 17. The gage housing is dimensioned so that the gage between the upper and lower portions will accommodate strip S in a horizontal plane, and further, be adapted to be stationary when strip S moves, or alternatively, is adapted to traverse strip S during gaging operations.

Controlled-gain photodetector 18 includes photomultiplier tube 19 which converts the light source from scintillator 17 into an electrical signal. Photomultiplier tube 19 is circuited in a manner similar to that shown in the Mangan patent, supra, even though this circuitry is not shown specifically in FIG. 1. It is preferred that photomultiplier tube 19 have a low dark current, a photocathode, a string of about 10-dynodes, and an anode, such as an RCA type 6342A, or equal. Conversion is accomplished by imaging the light source onto the photocathode which is connected to one end of a dynode energizing voltage which is varied as described below.

The photocathode is also circuited to a conventional voltage divider network which has a plurality of taps connected to the dynode string and is terminated at ground through a resistor. Current from the photomultiplier tube's anode is conducted through a high-impedance load resistor to ground. The voltage drop produced across this load resistor is fed to operational type of preamplifier 20, which includes a suitable feedback resistor and produces a voltage at photodetector 18 output on lead 21.

It should be noted that, although not shown specifically in FIG. 1, constant resistance circuits are maintained through the dynode voltage divider network and resistor to ground, and through the anode load resistor to ground, thereby providing simplified photomultiplier tube 19 circuitry while maintaining constant operating characteristics throughout a single, wide range of gage measurements. This also provides better operating stability and improved accuracy. There is no regulator in the dynode voltage divider network, or a nonlinear network in place of the anode load resistor, to cause corrective signal variations as is done in some prior art optical densitometers which use photomultiplier tubes in similar measuring circuits. Such measuring circuits are not to be confused with those of the present invention since optical densitometers operate on the basis of the Beers-Lambert law which states that optical density, or absorbence, $A = \log 10\ 1/T$, where $T$ is the transmittance of the absorbing material. Whereas, the present thickness deviation gage has as a basis of operation Lambert's law, modified for X-ray and nuclear radiation, which relates to the mass absorption phenomenon as defined by equation (1).

The photomultiplier tube 19 inverse phenomenon mentioned above will now be described.

Figure 3:
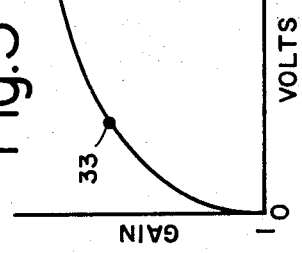
FIG. 3 is a graph illustrating the radiation detector's photomultiplier tube gain versus dynode voltage phenomenon.

The photomultiplier's photocathode converts scintillator 17 light source into a source of electrons which varies proportional to light intensity. These electrons are collected by the string of dynodes, an exponential or nonlinear current gain is exhibited by photomultiplier tube 19, this phenomenon being illustrated graphically in FIG. 3. Photomultiplier tube 19 current gain is expressed as:

$$G_i = K_1 V^{nk_2} \text{ where:} \quad (2)$$

$G_i$ = Current gain
$K_1$ = Proportionality constant
$V$ = Interdynode voltage, i.e., dynode energizing voltage
$n$ = Number of dynodes
$k_2$ = Tube constant Since the photocathode current ($i_p$) will be proportional to the intensity of emergent radiation 16, i.e., $I$ in equation (1), the relationship exists:

$$i_p = KI \quad (3)$$

The anode current ($i_a$) will then be the product of tube gain ($G_i$) and photocathode current and expressed as:

$$i_a = (G_i)(i_p)$$
$$= (G_i)(KI) \quad (4)$$

Substituting the relationships already developed in equations (1) and (2), the following evolves:

$$i_a = (K_1 V^{nk_2})(KI_o e - (\mu/\rho)(\rho t)) \quad (5)$$

Further, if the anode current ($i_a$) is considered to be held constant and a solution for $V$ is sought, then:

$$V^{nk_2} = (i_a/k_1 KI_o) e\ (\mu/\rho)\ \rho t \quad (6)$$

By combining constants and simplifying, the following general relationship exists:

$$V = C_1 e^{c_2 t} \quad (7)$$

Figure 4:
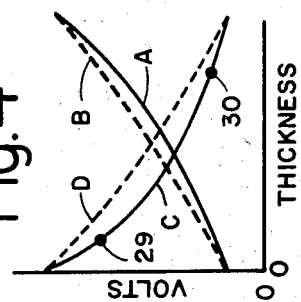
FIG. 4 is a graph illustrating gage voltage relationships versus a material property such as thickness at a known density where (A) is the slight nonlinearity resulting from combining the inverse phenomena illustrated in the graphs of FIGS. 2 and 3 when using a constant average potential X-ray source of radiation; (B) the same as (A), except using a monoenergetic nuclear source of radiation; (C) the photodetector variable gain characteristic using a constant average potential X-ray source of radiation; and (D) the same as (C), except using a nonoenergetic nuclear source of radiation.

From equation (7), and FIG. 4, curve A when radiation source 10 produces X-rays, it can be seen that an exponential or nonlinear relationship exists between the thickness of strip S in radiation beam 15 and the energizing voltage applied to the string of dynodes in photomultiplier tube 19, it being considered that photomultiplier tube 19 is operated in a constant anode current mode as is done herein. This relationship establishes photodetector 18 as a controlled-gain photodetector having a nonlinear gain characteristic inverse and nearly equal the nonlinear characteristic of scintillator 17 light source. This gain characteristic is illustrated in FIG. 4, curve C when radiation source 10 produces X-rays.

In order to provide a variable energizing voltage for the photomultiplier tube's string of dynodes, controlled-gain photodetector 18 is operated in an interruptable self-balancing measuring loop which also includes deviation measuring circuit 22 which develops an error signal, and switched automatic balancing circuit 23 which provides the variable energizing voltage in response to the error signal.

Deviation measuring circuit 22 receives photodetector 18 output voltage on lead 21 and amplifies it in adjustable gain amplifier 24 included in measuring circuit 22. When radiation source 10 consists of a pulsed X-ray source, the output from amplifier 24 is pulsed and is fed to a commercially available sample-and-hold circuit 25. The latter is controlled by trigger pulse generator 26, a differentiator for example, receiving sequential pulses on lead 27 from the same pulse source that controls the generation of pulsed X-rays in source 10. With this arrangement, only the peaks of the pulsed amplifier 24 are sampled and held between triggering pulses, thereby providing a more accurate, reliable and smooth voltage for further processing in deviation measuring circuits 22 than would be provided by the pulsed output from amplifier 24. When radiation source 10 is steady, such as a DC controlled X-ray source, sample-and-hold circuit 25, trigger pulse generator 26, and lead 27 are deleted from deviation measuring circuit 22.

Also included in deviation measuring circuit 22 is logarithmic amplifier 28 which receives the output from sample-and-hold circuit 25 when a pulsed source of radiation is used, or the output directly from amplifier 24 when a steady source of radiation is used, whichever applies to the pertinent radiation gage arrangement. Logarithmic amplifier 28, for example, a Philbrick Researches, Inc. model No. PPL4-P having a diode in an internal feedback circuit, provides a linearizing function with reference to FIG. 4, curve C, by correcting photodetector 18 output voltage a uniform linear amount, but of different slope or rate of change, at each operating point along curve C representing any nominal thickness established by calibration standards magazine 12. In other words, as strip S thickness increases the output from logarithmic amplifier 28, when the self-balancing measuring loop has been interrupted to provide a fixed gain, will decrease a greater linear amount for the same limited positive or negative deviation of strip S thickness from operating point 29 on FIG. 4, curve C than it will from operating point 30. This is because of the difference in slope of curve C at these points. Correction for differences in slope will be described below.

The output voltage from logarithmic amplifier 28 is fed to commercially available comparator 31 for comparision with the output of reference voltage source 32 so as to develop an error voltage. The magnitude of the reference voltage is selected to establish operating point 33 on the curve in FIG. 3 as the gage zero when there are neither calibration standards nor strip S in radiation beam 15. This also establishes a virtually zero error voltage on lead 34 at the output of comparator 31, and therefore the output of deviation measuring circuit 22.

The interruptable self-balancing measuring loop also includes switched automatic balancing circuit 23 that receives the error voltage on lead 34 and functions as a true null-seeking circuit, such as would an electromechanical or digital servo type of circuit. However, as shown in FIG. 1, automatic balancing circuit 23 includes a switched integrator 35 consisting of electronic switch 36, such as Burr-Brown Co., Model No. 9859-15, which normally enables passage of the error voltage on lead 34 except when disabled as noted below, and true integrator 37 having a feedback capacitor, such as Burr-Brown Co. Model No. 4013-25, which integrates the error voltage on lead 34 during the time that electronic switch is enabled. Integrator 37 thus produces and stores a voltage relative to thickness of material, such as calibration standards or strip S, which is inserted in radiation beam 15. This voltage, which varies slightly nonlinearly as in FIG. 4A, is fed as a control voltage over lead 38 to voltage controlled high voltage source 39 which has a 0 to 1,000 V. DC rating and a positive ground, such as KEPCO Model No. OPS1000. Thus, a variable negative high voltage proportional to the slightly nonlinear integrated error voltage on lead 38 is produced at the output of high voltage source 39 and fed over lead 40 as the dynode energizing voltage for the string of dynodes in the photomultiplier tube in photodetector 18. The dynode energizing voltage on lead 40 is caused to vary, for example, from −500 volts to −250 volts when scintillator 17 light source varies from light to dark, or in other words, when strip S thickness varies over a wide range from zero to maximum value. In the present embodiment, this range would be from zero to 0.125 inches thickness.

Switched automatic balancing circuit 23 is circuited internally, and in the self-balancing measuring loop, so that whenever electronic switch 36 is enabled and a change in material thickness, such as calibration standards from magazine 12 or strip S, occurs in the radiation beam 15, thus causing a change in scintillator 17 light source intensity, photomultiplier tube anode current flow changes momentarily. This momentary change in anode current flow causes an imbalance in the measuring loop and the momentary production of an error voltage on lead 34, thereby causing a new integrated voltage to appear on lead 38 and a corresponding change in dynode energizing voltage on lead 40. The change in dynode energizing voltage on lead 40 varies in such manner as to restore and maintain the photomultiplier tube's anode current at a constant value. As a result of the null-seeking action of switched automatic balancing circuit 23, the error voltage on lead 34 is reduced to zero when the self-balancing measuring loop stabilizes, integrator 37 output voltage on lead 38 stabilizes at a new level, and high voltage source 39 dynode voltage is maintained at a new constant value on lead 40, thereby establishing a new operating point on photodetector 18 gain characteristic curve in relation to the present material thickness in the radiation beam 15.

Interruption of the self-balancing loop is desired at a predetermined nominal material thickness as determined by the preselected digital combination of calibration standards from magazine 12 being inserted into radiation beam 15. Subsequently, as strip S enters the radiation gage, but before entering radiation beam 15, material detector 41 detects the leading edge of strip S electro-optically in response to a change in incident light 42 and produces a material presence pulse on lead 43, thereby disabling electronic switch 36 and automatic balancing circuit 23. This action interrupts the self-balancing measuring loop which, after stabilizing, produces a zero error voltage at lead 34, a stable integrator 37 output voltage at lead 38, and maintains photodetector 18 gain at a constant new value, the latter two features as determined by the nominal material thickness of calibration standards in radiation beam 15.

After the self-balancing loop has been interrupted and stabilized, the material presence pulse on lead 43 signals standards and shutter controller 13 to cause removal of the preselected nominal thickness calibration standards from radiation beam 15. After strip S has entered radiation beam 15 and its thickness is the same as the preselected nominal thickness at which the self-balancing measuring loop was interrupted, then a zero error voltage will appear on lead 34 as long as this condition prevails. However, when the thickness of strip S differs from the preset nominal value, then a corresponding positive or negative error voltage will appear on lead 34 because the gain of photodetector 18 is maintained at a fixed value by switched automatic balancing circuit 23, thus permitting a change in photomultiplier tube anode current and the variable input voltage to comparator 31.

As noted above, when strip S nominal thickness increases, the output of logarithmic amplifier 28 with reference to FIG. 4 curve C and a fixed photodetector 18 gain will decrease a greater linear amount for the same limited positive or negative deviation of strip S thickness from operating point 29 than it will from operating point 30. Thus, the positive or negative error voltage on lead 34 will vary correspondingly in accordance with thickness of strip S deviation from the preselected nominal thickness value. For this reason the embodiment shown in FIG. 1 also includes deviation gain adjusting circuit 44 which processes both nominal thickness related voltage on lead 38 and the error or thickness deviation voltage on lead 34.

Deviation gain adjusting circuit 44 includes adjustable gain logarithmic amplifier 45, such as Philbrick Researches, Inc. Model No. PPL4–N, which receives the slightly nonlinear integrated thickness voltage on lead 38 and scales down and linearizes this voltage to account for the differences in nonlinear characteristics between FIG. 4 curve A and curve C. That is, the output voltage from logarithmic amplifier 45 reduces nonlinearly as the thickness of strip S increases. To accommodate this characteristic deviation gage adjusting circuit 44 also includes divider 46, such as Burr-Brown Co. Model No. 4096–15, which divides the thickness deviation voltage on lead 34, which also reduces nonlinearly in magnitude with increases in thickness of strip S, by the steady nominal thickness voltage produced by logarithmic amplifier 45. As a result, divider 46 produces a linear thickness deviation voltage of constant gain at its output, which voltage is scaled in adjustable gain amplifier 47 to correspond to engineering units of, for example, up to plus or minus 0.010 inches maximum deviation from the preset nominal thickness value anywhere in the wide range of thickness measurements. The scaled, linear thickness deviation voltage at the output of amplifier 47, which is also the output of deviation gain adjusting circuit 44, is fed over lead 48 to deviation indicator 49 which indicates instantaneous thickness deviation of strip S from the preselected nominal thickness value.

It is to be noted that a thickness profile recorder, or other thickness deviation analysis equipment, or even the input of an automatic control system, may be substituted for indicator 49 to receive the scaled, linear thickness deviation voltage on lead 48.

After strip S has been gaged and its trailing edge leaves the gaging apparatus, material detector 41 is restored to its original condition and ceases to produce a material presence pulse on lead 43. This enables electronic switch 36 and permits switched automatic balancing circuit 23 to seek another null position, thus restoring the interruptable self-balancing measuring loop to the function described above.

Figure 2:
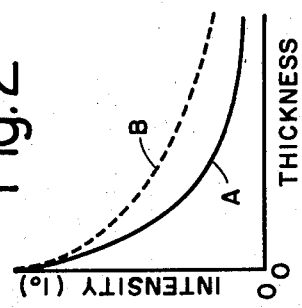
FIG. 2 is a graph illustrating the mass absorption phenomenon in terms of radiation emerging from material being gaged versus a material property such as thickness at a known density where (A) is based on using a constant average potential X-ray source of radiation; and (B) is based on using a monoenergetic nuclear source of radiation.

In an alternative arrangement of the embodiment shown in FIG. 1, a monoenergetic nuclear radiation source of equivalent penetrative potential may be substituted for constant X-radiation source 10. Caesium 137 has been found an effective source of gamma photons for this purpose and its absorption effects on strip S are illustrated in FIG. 2, curve B. One advantage of using a nuclear source of radiation is that because the source emits radiation steadily, the sample-and-hold circuit 25, trigger pulse generator 26 and lead 27, may all be deleted from the radiation gaging apparatus. Another advantage is that the inverse phenomena defined by equations (1) and (2) are less exponential and result in equation (7) being nearly linear over a wide range, this being illustrated in FIG. 4, curve B. Still another advantage is that photodetector gain characteristics are less exponential, this being illustrated in FIG. 4, curve D. As a result of the latter two advantages, logarithmic amplifier 45 and divider 46 may be deleted from the gaging apparatus. The output of amplifier 24 would be connected to logarithmic amplifier 28 to produce the error voltage on lead 34. The error voltage on lead 34 would be connected to adjustable gain amplifier 47 as this voltage would vary substantially linearly with thickness deviation from the nominal thickness value anywhere in the wide range of thickness measurements. Therefore, there would be no need to utilize the integrated voltage on lead 38 for processing purposes.

We claim:

1. In a material measuring system which converts radiation into a light source as a function of a material property, wide-range photoelectric gaging apparatus for determining deviation of a material property from a nominal value, comprising:
    a. an interruptable self-balancing measuring loop comprising: (.1) a variable-gain photodetector receiving said light source, (.2) deviation measuring circuit means operative in response to photodetector output for producing an error signal related to said material property, and (.3) switched automatic balancing circuit means for varying photodetector gain in response to said error signal, thereby reducing the error signal and balancing the measuring loop at a null point anywhere in a wide range of gage operation, said balancing circuit means adapted to be disabled and maintain photodetector gain at a fixed value in response to material presence pulse,
    b. material standards means introduced into the radiation prior to material gaging for causing said measuring loop to zero said error signal and establish photodetector gain at a null point corresponding to a nominal value of material to be gaged,
    c. means responsive to standards presence and material movement into said gage for producing said material presence pulse, thereby interrupting the self-balancing measuring loop at said nominal material value and thereafter causing said material standards to be removed from said radiation, and d. utilization means responsive to said error signal for determining the amount of deviation of said material property from said nominal value thereof.

2. In a material measuring system which converts radiation into a light source as a function of a material property, wide-range photoelectric gaging apparatus for determining deviation of a material property from a nominal value, comprising:
    a. a controlled-gain photodetector for producing a variable detector signal in response to variations in said light source and a gain controlling energizing signal,
    b. measuring circuit means including comparator means responsive to the difference between said detector signal and a comparator reference signal for producing an error signal,
    c. switched integrator circuit means for integrating said error signal and producing an integrated error signal which is related to a nominal value of said material property being gaged, said integrator circuit adapted to be disabled and maintain its output in response to a material presence pulse,
    d. a variable source of gain-controlling energizing signal responsive to the integrated error signal for varying photodetector gain to maintain said error signal at a virtually zero value,
    e. material standards means introduced into the radiation prior to material gaging for causing said measuring loop to zero said error signal and establish photodetector gain at a null point corresponding to a nominal value of material to be gaged,
    f. means for generating said material presence pulse in response to standards presence and a leading edge of said material entering the gaging apparatus, said pulse disabling said integrator and maintaining said energizing voltage and said photodetector gain at a constant value corresponding to the nominal value of said material property, and thereafter said material presence pulse causing said material standards means to be removed from said radiation, and g. utilization means responsive to the error signal to determine the amount of deviation of said material property from a nominal value thereof.

3. In a material measuring system which converts radiation into a nonlinear light source as a function of a material property, wide-range photoelectric gaging apparatus for determining deviation of a material property from a nominal value, comprising:

a. a controlled-gain photodetector for producing a variable detector signal in response to variations in said nonlinear light source and a gain controlling energizing signal, said photodetector gain varying nonlinearly with said material property, b. measuring circuit means including linearizer means for performing a predetermined correction of said detector signal and further including comparator means responsive to the linearized detector signal and a comparator reference signal for producing an error signal having a predetermined correction, c. switched integrator circuit means for integrating said corrected error signal and producing an integrated error signal having a nonlinear relationship to a nominal value of the material property being gaged, said integrator circuit adapted to be disabled and maintain its output in response to a material presence pulse, d. a variable source of gain-controlling energizing signal responsive to the integrated, corrected, error signal for varying photodetector gain to maintain said error signal at a virtually zero value, e. material standards means introduced into the radiation prior to material gaging for causing said measuring loop to zero said error signal and establish photodetector gain at a null point corresponding to a nominal value of material to be gaged, f. means for generating said material presence pulse in response to standards presence and a leading edge of said material entering the gaging apparatus, said pulse disabling said integrator and maintaining said energizing voltage and said photodetector gain at a constant value corresponding to said nominal property, and thereafter said material presence pulse causing said material standards means to be removed from said radiation, g. deviation gain adjusting circuit means for processing said corrected error signal and said integrated corrected error signal to produce a constant-gain linear deviation signal, and h. utilization means responsive to said linear deviation signal to determine the amount of deviation of said material property from said nominal value thereof.

4. A wide-range radiation gage for determining deviation of a material property from a nominal value, comprising:

a. means including a source of radiation and a scintillator for producing a light source which varies as a function of said material property, b. an interruptable self-balancing measuring loop comprising (.1) a variable-gain photodetector receiving said light source, (.2) deviation measuring circuit means operative in response to photodetector output for producing an error signal related to said material property, and (.3) switched automatic balancing circuit means for varying photodetector gain in response to said error signal, thereby reducing the error signal and balancing the measuring loop at a null point anywhere in a wide range of gage operation, said balancing circuit means adapted to be disabled and maintain photodetector gain at a fixed value in response to material presence pulse, b. material standards means introduced into the radiation prior to material gaging for causing said measuring loop to zero said error signal and establish photodetector gain at a null point corresponding to a nominal value of material to be gaged, c. means responsive to standards presence and material movement into said gage for producing said material presence pulse, thereby interrupting the self-balancing measuring loop at said nominal material value and thereafter causing said material standards to be removed from said radiation, and d. utilization means responsive to said error signal for determining the amount of deviation of said material property from said nominal value thereof.

5. The apparatus of claim 4 wherein said source of radiation is constant average potential X-ray source.

6. The apparatus of claim 4 wherein said source of radiation is a pulsed average potential X-ray source and the deviation circuit means includes a sample-and-hold circuit triggered in response to the pulsing of said X-ray source for sampling and holding of the peaks of pulsed photodetector signals.

7. The apparatus of claim 4 wherein said source of radiation is a nuclear radiation source, preferably monoenergetic.

8. The apparatus of claim 4 wherein said material standards means includes digital mechanical standards adapted to be interposed in a path between said radiation source and said scintillator in response to preselection signals, said standards means further adapted to be removed from said path in response to said means (d).

9. The apparatus of claim 4 wherein said means (d) is adapted to act in response to detecting the leading edge of the gaged material when entering the radiation gage.

* * * * *